G. B. REISBACH.
MECHANICAL MOVEMENT.
APPLICATION FILED FEB. 21, 1907.
1,126,084.
Patented Jan. 26, 1915.
3 SHEETS—SHEET 3.
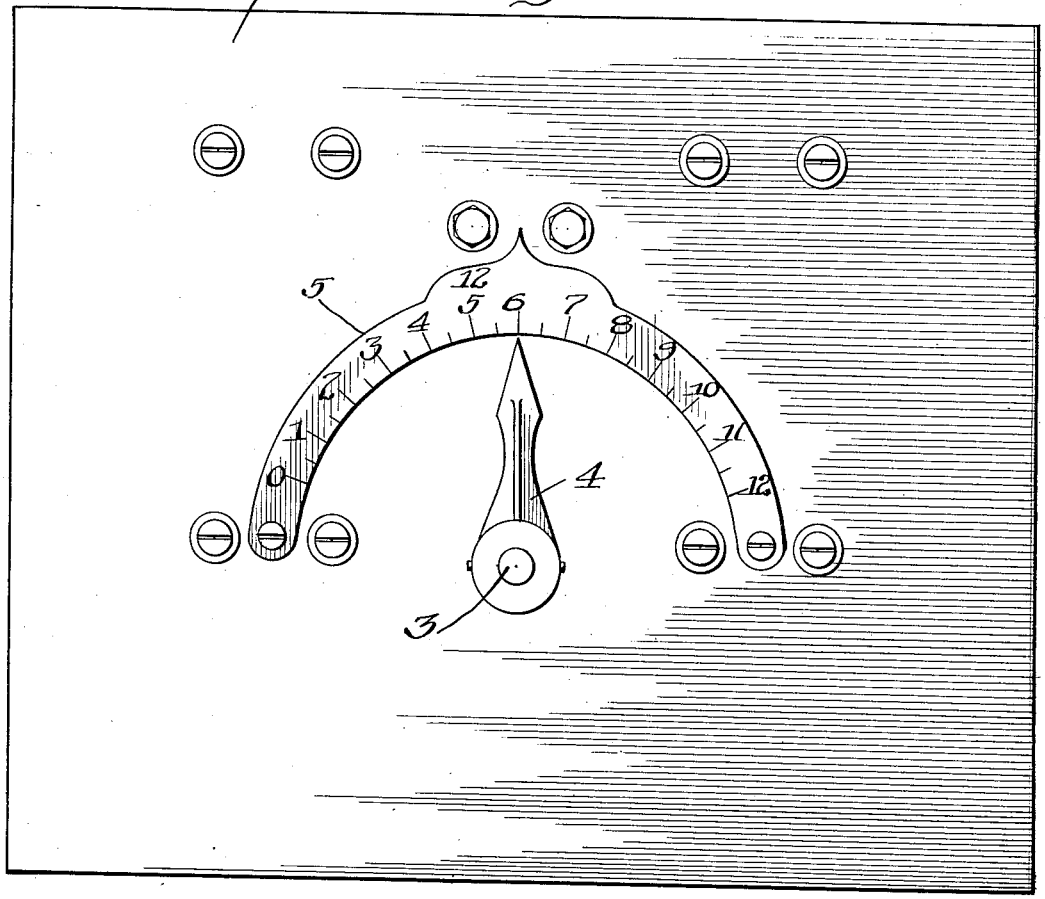
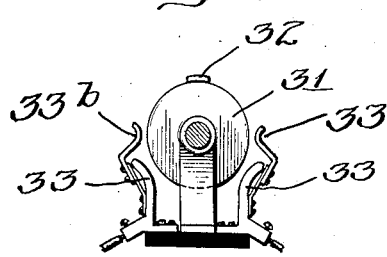
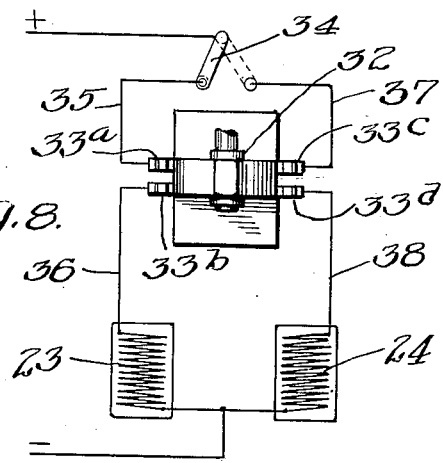

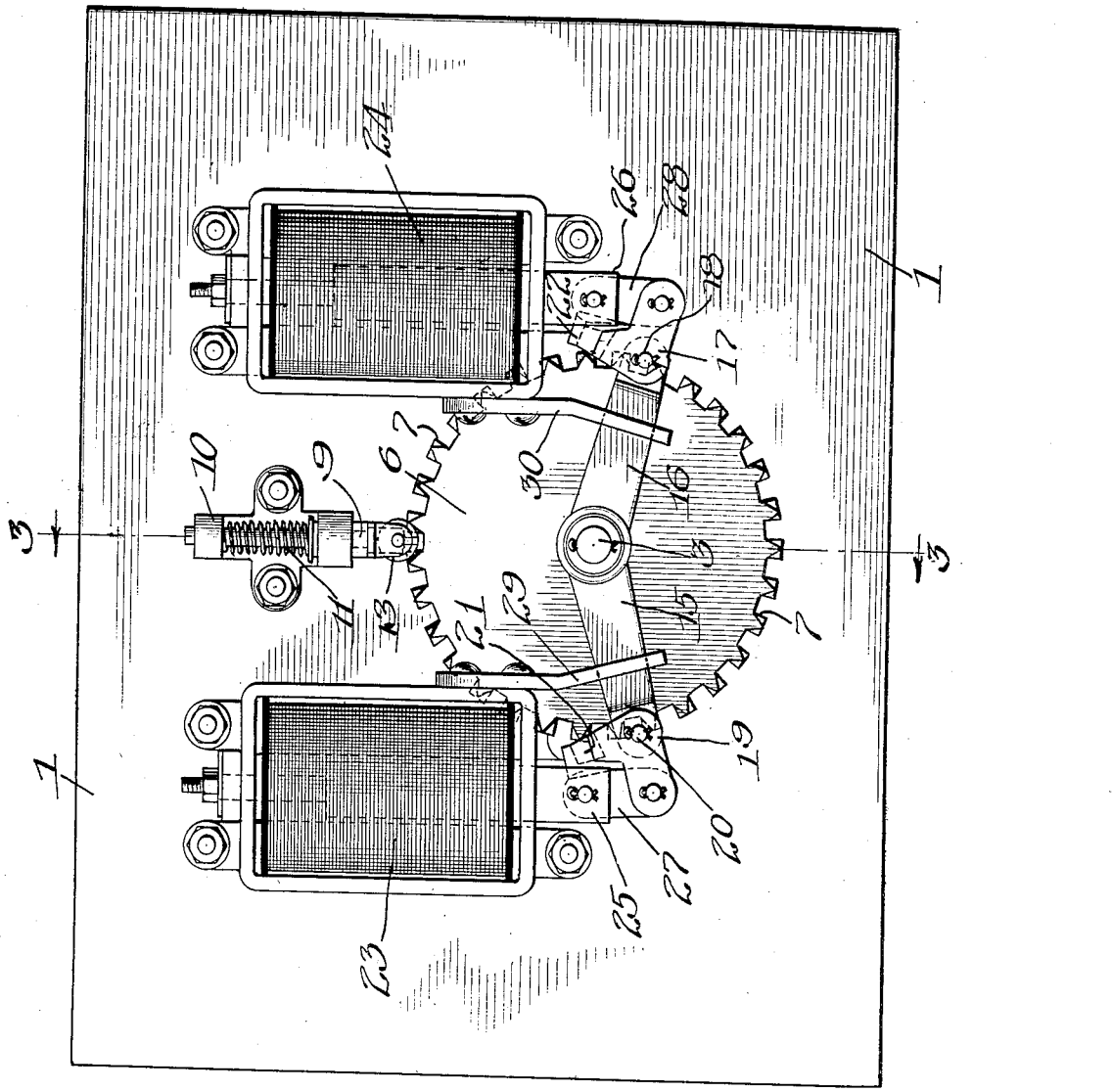

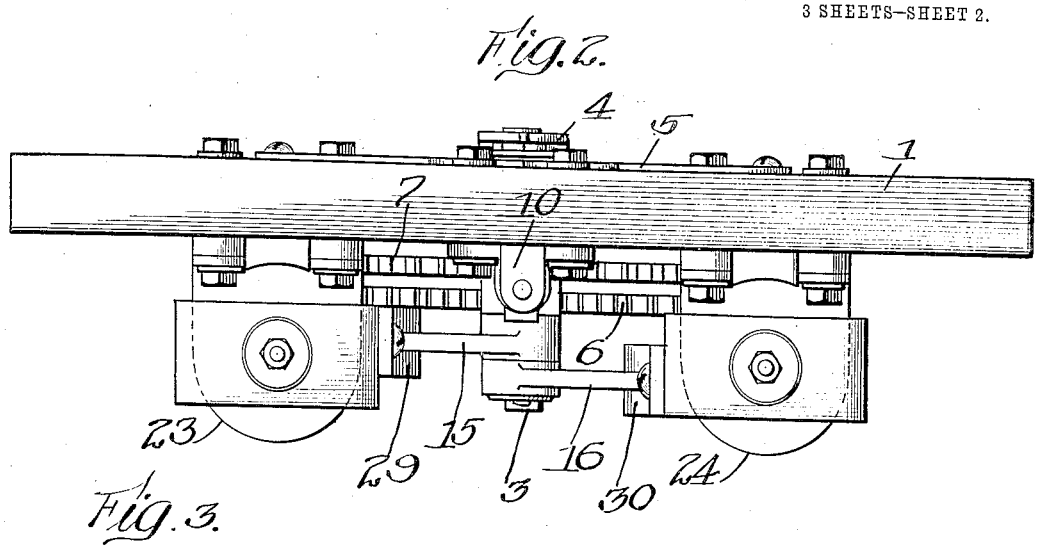
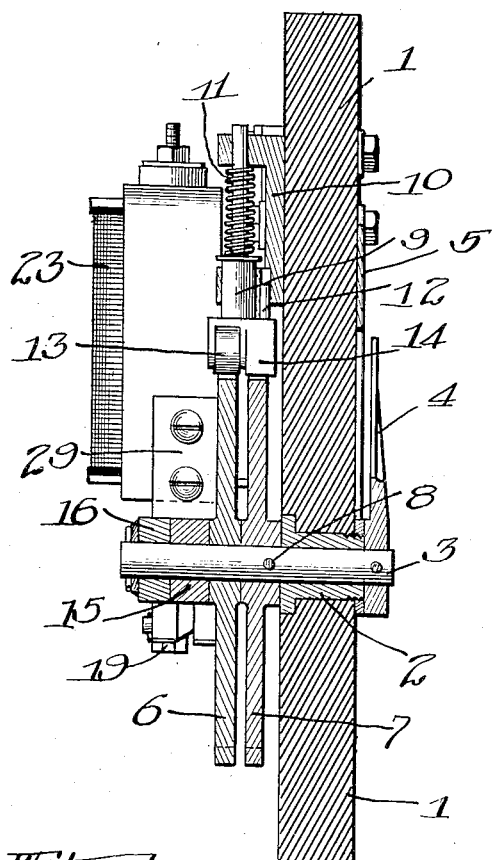
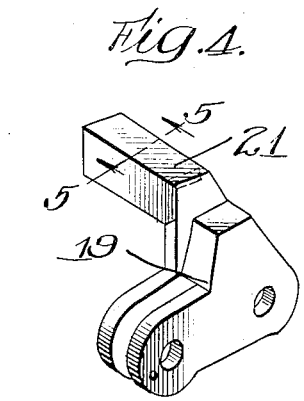
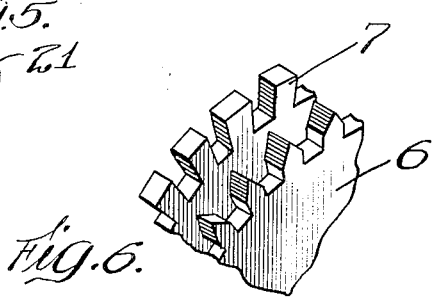

UNITED STATES PATENT OFFICE.

GUSTAVE B. REISBACH, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

MECHANICAL MOVEMENT.

1,126,084.     Specification of Letters Patent.     Patented Jan. 26, 1915.

Application filed February 21, 1907. Serial No. 358,568.

*To all whom it may concern:*

Be it known that I, GUSTAVE B. REISBACH, a subject of the Emperor of Germany, residing at Milwaukee, in the county of Milwaukee and State of Wisconsin, have invented new and useful Improvements in Mechanical Movements, of which the following is a full, clear, concise, and exact description, reference being had to the accompanying drawing, forming a part of this specification.

My invention relates to improvements in mechanical movements.

It has for its object to provide an automatically operable mechanical movement which will be locked against manual operation.

In order to set forth my invention I shall describe the same as embodied in the mechanism which is illustrated in the accompanying drawings.

Figure 1 is a front elevation of the mechanical movement, Fig. 2 is a plan view thereof, Fig. 3 is a sectional view on the line 3—3 of Fig. 1, Fig. 4 is a perspective view of the pivoted pawl, Fig. 5 is a sectional view on the line 5—5 of Fig. 4, Fig. 6 is a perspective view of a portion of the ratchet wheels, Fig. 7 is a view of an indicator that may be operated by my mechanical movement, Fig. 8 is a diagram of an electrical system that may be employed to operate my mechanical movement, and Fig. 9 is an end view of a commutator which may be used in the electrical system of control.

The base 1 carries a bearing sleeve 2 in which is journaled a shaft or spindle 3. The spindle may carry a pointer 4 which plays over a dial 5. The shaft 3 carries a pointed tooth ratchet wheel 6 and a flat tooth ratchet wheel 7. According to the structure shown in the drawing, the pointed tooth ratchet wheel 6 is loosely mounted upon the shaft 3, while the flat tooth ratchet wheel 7 is fixed upon said shaft by means of a pin or other suitable means 8. The ratchet wheels are engaged by a pawl 9 which is slidably mounted in a guide 10 which may be mounted upon the base 1. A spring 11 serves to press the pawl downwardly into engagement with the ratchet wheels. The pawl is prevented from turning in its bearing by means of a pin 12 mounted thereon and entering a hole in the guide 10. The pawl preferably carries a roller 13 and a tooth 14. The roller engages the pointed teeth of the ratchet wheel 6. The tooth 14 engages the flat or locking teeth of the ratchet wheel 7.

Two arms 15 and 16 are pivoted on the shaft 3. A bell crank pawl 17 is pivoted on the outer end of the arm 16 by means of a pin 18. A similar pawl 19 is pivoted on the outer end of the arm 15 by means of a pin 20. One arm of the pawl 19 is provided with a finger 21, which extends across the peripheries of both ratchet wheels 6 and 7, and which is adapted to engage the teeth of said wheels. The pawl 17 is provided with a similar finger 22.

Two solenoids 23 and 24 are suitably mounted upon frames attached to the base 1. These solenoids are provided with plungers 25 and 26 respectively. The plunger 25 is connected to the pawl 19 by means of a link 27 which is suitably pivoted to said parts by means of pins. The plunger 26 and the pawl 17 are similarly connected by means of a link 28. The frames of solenoids 23 and 24 carry guides 29 and 30 for the arms 15 and 16.

It will be noted that if the two ratchet wheels be turned simultaneously, the pointed teeth of the ratchet wheel 6 will engage the roller 13 and raise the pawl to remove the tooth 14 from engagement with the flat teeth of the ratchet wheel 7, thus allowing the lower ratchet wheel to be rotated. It would be impossible to turn the ratchet wheel 7 alone, however, as the tooth 14 locks it against rotation.

When the solenoid 24 is energized, it will raise its plunger 26, thereby tilting the pawl 17 until the finger 22 engages the teeth of the ratchet wheels 6 and 7, when the arm 16 will be drawn upwardly. The pawl 17 will thus cause the ratchet wheels to turn together for a predetermined degree. When the solenoid 24 is deënergized, the plunger 26 will descend, thereby withdrawing finger 22 from the ratchet teeth and allowing the arm 16 to return to its normal position. The ratchet wheels may thus be turned together step by step by intermittently energizing the solenoid 24.

When the solenoid 23 is energized it will operate the pawl 19 in the same manner as the solenoid 24 operates the pawl 17, thereby causing rotation of the ratchet wheels. The direction of rotation of the ratchets which is produced by the pawl 19 is opposite to that produced by the pawl 17. The ratchet wheels may, therefore, be turned in either direction.

A system of electrical control which may be used to interrupt the circuits to intermittently cause the energization of the solenoids 23 or 24 is illustrated in Fig. 8.

My mechanical movement may be used in various relations and for various purposes. In order to indicate one application of the same, I shall describe its operation as applied to an electrical system of valve control. Such systems usually employ an electric motor for operating the valve. My mechanical movement may be used to operate the hand 4 to indicate the position of the valve. In order that it may perform such a function, a commutator or switch adapted to control the circuits of the solenoid 23 and 24 may be mechanically operated by the motor. The commutator may consist of a rotatable drum 31 which carries a contact 32. Suitable brushes or contact fingers 33 are adapted to engage the contact 32. It will be noted that as the drum 31 turns, the contact 32 will engage the brushes 33. In order to direct the direction of the movement of the hand 4, a switch 34 may be provided. It may be assumed that the switch 34 stands in the position shown in the drawing. During each revolution of the drum 31, the circuit of the solenoid 23 will be closed momentarily from the positive line through switch 34, conductor 35, brush 33ª, contact 32, brush 33ᵇ, conductor 36, and solenoid 23 to the negative line. The commutator will, therefore, cause the solenoid 23 to be intermittently energized. Inasmuch as the commutator is driven by the motor, the hand 4 will indicate the position to which the valve is moved. The switch 34 may be automatically moved to the position illustrated by dotted lines, when the motor runs in a reverse direction. During each revolution of the drum the circuit of solenoid 24 will then be momentarily closed from the positive line, through switch 34, conductor 37, brush 33ᶜ, contact 32, brush 33ᵈ, conductor 38, and solenoid 24 to the negative line. It will thus be seen that my mechanical movement may operate the indicator 4 in either direction to indicate the operation of the motor and the position of the valve.

While I have described my mechanical movement as applied to a system of valve control, it will be understood that it is applicable to other purposes and may be employed to perform various functions. The claims appended hereto are, therefore, intended to extend to the various relations to which my invention may be applied. Of course various changes may be made in the arrangement, construction and operation of parts which are introduced in the particular form of my invention illustrated in the drawings.

Having thus described my invention, what I claim as new and desire to secure by Letters Patent is

1. In a mechanical movement, in combination, two independently rotatable members, a lock arranged to hold one of said members against rotation, and operated by the other member to release the first mentioned member when said members are rotated simultaneously, and means for rotating said members simultaneously.

2. In combination, a member movable in a step by step manner, a device for automatically locking said member upon each step of operation thereof, a second movable member normally free of said first member and adapted to be moved in a step by step manner similarly to and in synchronism with said first member to release the same, said first member being inoperative without simultaneous operation of said second member.

3. In combination, two independently movable members, a lock arranged to hold one of said members and adapted to be operated by the other member to release the first mentioned member upon simultaneous operation of said members, and automatic means for operating said movable members simultaneously.

4. In combination, two independently rotatable members, a lock arranged to hold one of said members against rotation and operated by the other member to release the first mentioned member when said members are rotated simultaneously, and automatic means for rotating said members simultaneously in either direction.

5. In combination, two independently rotatable members, a lock arranged to hold one of said members against rotation and operated by the other member to release the first mentioned member, and automatic means for rotating said members simultaneously and intermittently.

6. In combination, two independently rotatable members, a lock arranged to hold one of said members against rotation and operated by the other member to release the first mentioned member when said members are rotated simultaneously, and automatic means for rotating said members simultaneously and intermittently in either direction.

7. In combination, two independently rotatable ratchet wheels, one having locking teeth and the other cam teeth, a locking pawl adapted to engage said locking teeth and adapted to be operated by said cam teeth to withdraw it from said locking teeth when said wheels are operated simultaneously, and means for rotating said wheels simultaneously.

8. In combination, two rotatable members, a lock engaging one of said members to hold the same against rotation and operated by the other member to release the first mentioned member when said members are rotated simultaneously, a dog adapted to engage both members, and means adapted to operate said dog to rotate said members simultaneously.

9. In combination, two rotatable members, a lock engaging one of said members to hold the same against rotation and operated by the other member to release the first mentioned member when said members are rotated simultaneously, a dog adapted to engage both members, and an electromagnetic winding adapted to operate said dog to move said members simultaneously.

10. In combination, two independently rotatable toothed wheels, a lock engaging one of said wheels to hold the same against rotation and operated by the other wheel to disengage it from the first mentioned wheel when said wheels are rotated simultaneously, a pivoted arm, a dog pivoted upon said arm and adapted to engage both wheels, and means for operating said dog to throw it into engagement with said wheels and then rotate said wheels simultaneously.

11. In combination, two independently rotatable toothed wheels, a lock engaging one of said wheels to hold the same against rotation and operated by the other wheel to disengage it from the first mentioned wheel when said wheels are rotated simultaneously, a pivoted arm, a dog pivoted upon said arm and adapted to engage both wheels, and an electromagnetic winding for operating said dog to throw it into engagement with said wheels and then rotate said wheels simultaneously.

12. In combination, two independently rotatable toothed wheels, a lock engaging one of said wheels to hold the same against rotation and operated by the other wheel to disengage it from the first mentioned wheel when said members are rotated simultaneously, a pivoted arm, a dog pivoted upon said arm and adapted to engage both wheels, an electromagnetic winding for operating said dog to throw it into engagement with said wheels and then rotate said wheels simultaneously, and means for intermittently energizing said winding.

13. In combination, two independently rotatable ratchet wheels, a locking pawl for engaging one of said wheels to hold the same against rotation and operated by the other wheel to disengage said pawl from the first mentioned wheel when said wheels are rotated simultaneously, two pivoted arms, a dog pivoted upon the free end of each arm and adapted to engage both ratchet wheels, and means adapted to throw either of said dogs into engagement with said ratchet wheels and then rotate said ratchet wheels simultaneously.

14. In combination, two independently rotatable ratchet wheels, a locking pawl for engaging one of said wheels to hold the same against rotation and operated by the other wheel to disengage said pawl from the first mentioned wheel when said wheels are rotated simultaneously, two pivoted arms, a dog pivoted upon the free end of each arm and adapted to engage both ratchet wheels, and electromagnetic windings adapted to operate said dogs to throw either of the same into engagement with said ratchet wheels, and then move said ratchet wheels simultaneously.

15. In combination, two independently rotatable ratchet wheels, a locking pawl engaging one of said wheels to hold the same against rotation and operated by the other ratchet wheel to disengage it from the first mentioned wheel when said wheels are rotated simultaneously, a pivoted arm, a dog pivoted upon the free end of said arm and adapted to engage both ratchet wheels, an electromagnetic winding, a plunger adapted to be attracted by said winding, and a link connecting said plunger and said dog.

16. In combination, two independently rotatable ratchet wheels, a locking pawl engaging one of said ratchet wheels to hold it against rotation and operated by the other to disengage it from the first mentioned wheel when said wheels are rotated simultaneously, two arms pivoted concentrically with the axis of said wheels, a dog pivoted upon the free end of each of said arms and adapted to engage both wheels, and electromagnetic windings adapted to operate either of said dogs to throw the same into engagement with said ratchet wheels and then move said ratchet wheels simultaneously.

17. In combination, two independently rotatable ratchet wheels, a locking pawl engaging one of said wheels to lock it against rotation and operated by the other to disengage it from the first mentioned wheel when said wheels are rotated simultaneously, two arms pivoted concentrically with the axis of said wheels, a dog pivoted upon the free end of each of said arms and adapted to engage both wheels, a link connected to each dog, a plunger connected to each link, and an electromagnetic winding for attracting each plunger.

18. In combination, two independently rotatable ratchet wheels, a locking pawl engaging one of said wheels to lock it against rotation and operated by the other to disengage it from the first mentioned wheel when said wheels are rotated simultaneously, two arms pivoted concentrically with the axis of said wheels, a dog pivoted upon the free end of each of said arms and adapted to engage both wheels, a link connected to each dog, a plunger connected to each link, an electromagnetic winding for attracting each plunger, and means for intermittently energizing said windings.

19. In combination two independently rotatable ratchet wheels, a locking pawl engaging one of said wheels to hold it against rotation and operated by the other to disengage it from the first mentioned wheel when said wheels are rotated simultaneously, a pivoted arm, a dog pivoted upon said arm and adapted to engage both ratchet wheels, an electromagnetic winding adapted to operate said dog to throw it into engagement with said ratchet wheels and then turn said ratchet wheels simultaneously, and means operated by said ratchet wheels to indicate the rotary position of the latter.

20. In combination, two independently rotatable ratchet wheels, a locking pawl engaging one of said wheels to hold the same against rotation and operated by the other wheel to disengage it from the first mentioned wheel when said wheels are rotated simultaneously, two pivoted arms, a pawl pivoted upon each arm and adapted to engage both ratchet wheels, and means operated by said ratchet wheels to indicate the rotary position of the latter.

21. In combination, two independently rotatable wheels, one having flat teeth and the other cam teeth, a locking pawl engaging said flat teeth to hold the first mentioned wheel against rotation, a wheel carried by said pawl and engaging the cam teeth upon the other wheel, two arms pivoted concentrically with the axis of said wheels, a dog pivoted upon the free end of each of said arms and adapted to engage the teeth of both wheels, a link connected to each dog, a plunger connected to each link, and an electromagnetic winding for attracting each plunger.

22. In combination, a rotatable wheel having locking teeth thereon, a locking pawl adapted to automatically engage the locking teeth on said wheel, a second wheel normally movable independently of the first, said second wheel being provided with cam teeth for disengaging said pawl from the teeth of said first wheel, said pawl while in locking position permitting a joint movement of said two wheels sufficient to cause said second wheel to release said first wheel.

In witness whereof, I have hereunto subscribed my name in the presence of two witnesses.

GUSTAVE B. REISBACH.

Witnesses:
HENRY J. WIEGAND,
F. S. WILHOIT.